United States Patent [19]

Chall et al.

[11] 4,090,439
[45] May 23, 1978

[54] COMBINATION PITTER AND STUFFER FOR OLIVES

[75] Inventors: Harold J. Chall, Hayward; Frederick J. Cimperman, Castro Valley, both of Calif.

[73] Assignee: Vistan Corporation, San Leandro, Calif.

[21] Appl. No.: 776,108

[22] Filed: Mar. 10, 1977

Related U.S. Application Data

[63] Continuation of Ser. No. 586,888, Jun. 16, 1975, abandoned.

[51] Int. Cl.² ............................................. A23N 4/08
[52] U.S. Cl. ..................................... 99/494; 99/549; 99/559; 99/561; 198/631; 226/158
[58] Field of Search .............. 99/494, 544, 549, 559, 99/560, 561; 226/43, 158, 160, 146, 147, 53, 62; 198/384, 631, 393, 397, 480

[56] References Cited

U.S. PATENT DOCUMENTS

| | | | |
|---|---|---|---|
| 457,624 | 8/1891 | Skuborvius | 226/158 |
| 1,963,710 | 6/1934 | Mitchell | 226/158 |
| 2,643,694 | 6/1953 | Ashlock | 99/494 |
| 2,681,089 | 6/1954 | Francisco | 99/494 |
| 3,162,223 | 12/1964 | Loveland | 99/561 |
| 3,616,942 | 12/1969 | Gruber | 198/480 |

Primary Examiner—Harvey C. Hornsby
Assistant Examiner—Robert Pous
Attorney, Agent, or Firm—Naylor, Neal & Uilkema

[57] ABSTRACT

A turntable with olive cups is advanced stepwise by a suitable Geneva movement. At a feed station unpitted olives are delivered into the cups. Between the feed station and the pitting station the cups are vibrated to properly orient the olives for pitting. After pitting, the olives are stuffed with pimento, the pimento feed system including toothed drive means for a continuous pimento strip, a feed chute which serves to fold the strip in half along its lengthwise centerline, and cut-off knives to sever the strip into sections for stuffing.

2 Claims, 18 Drawing Figures

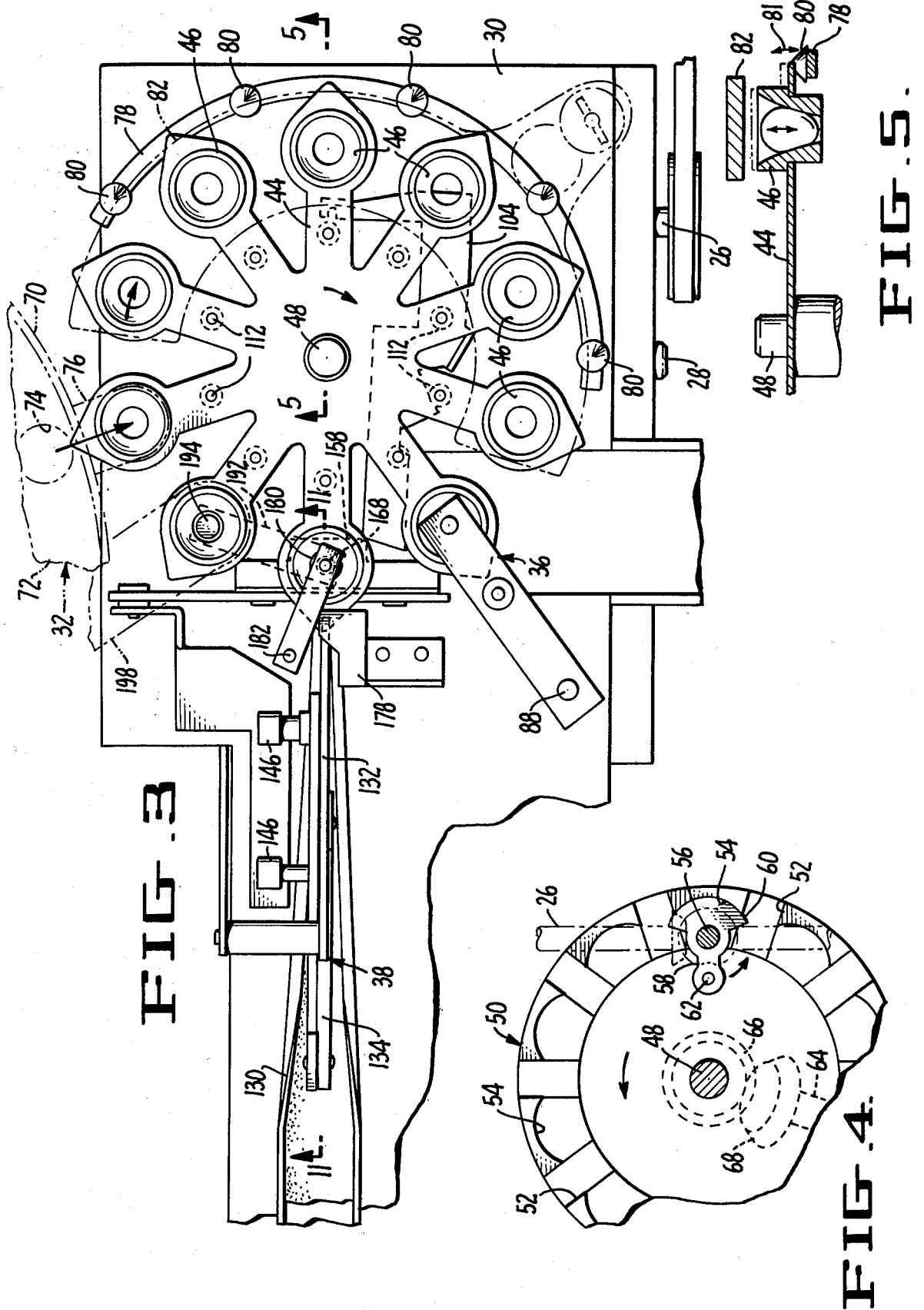

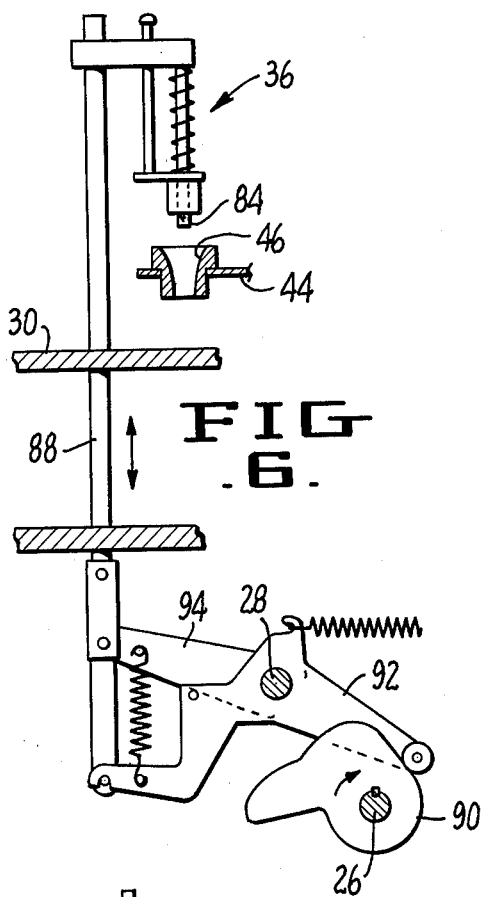
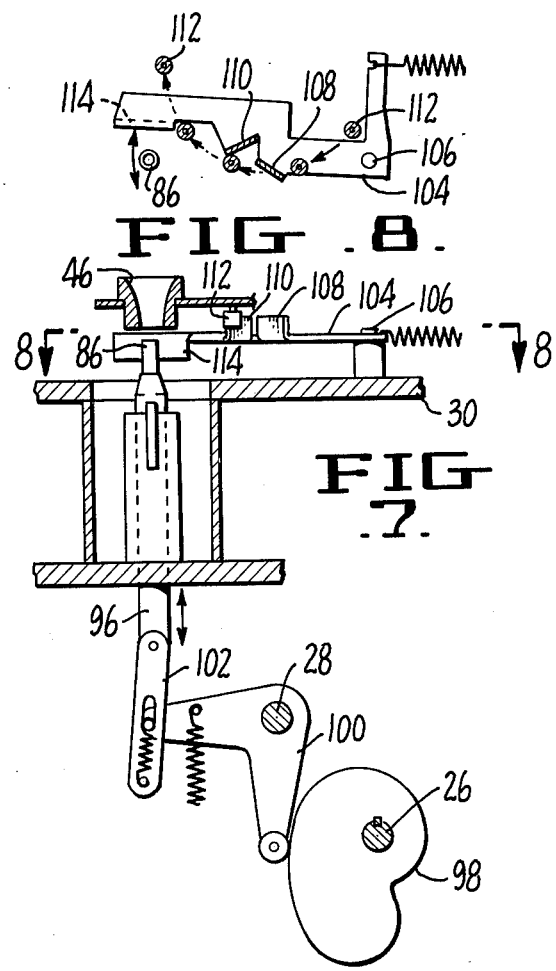
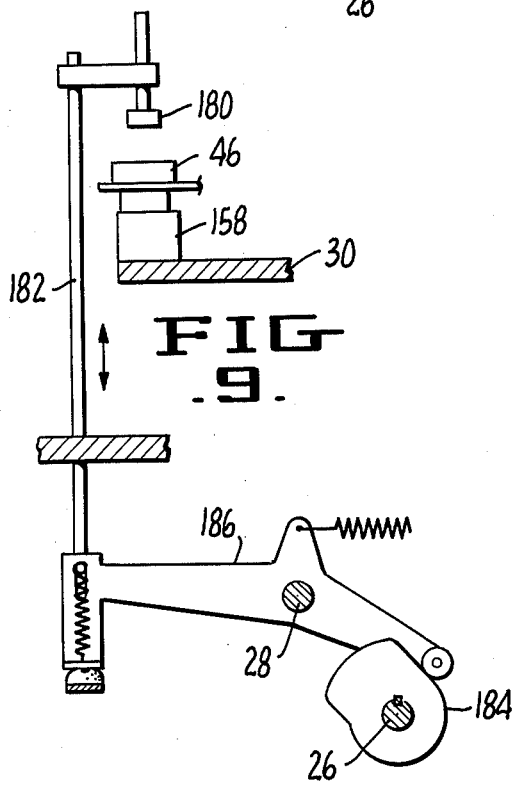
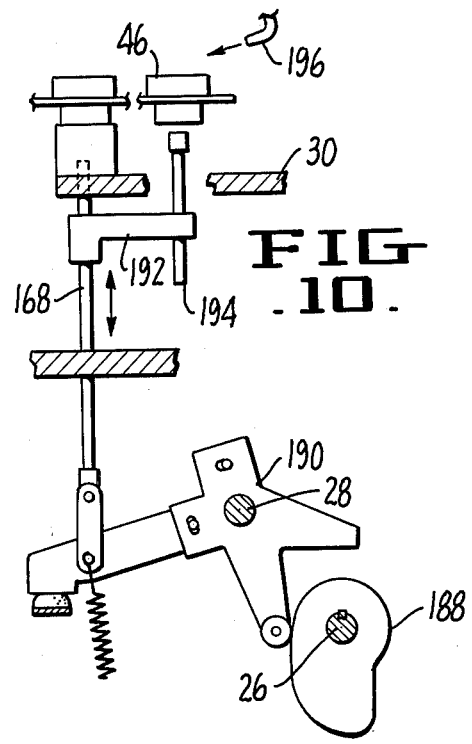

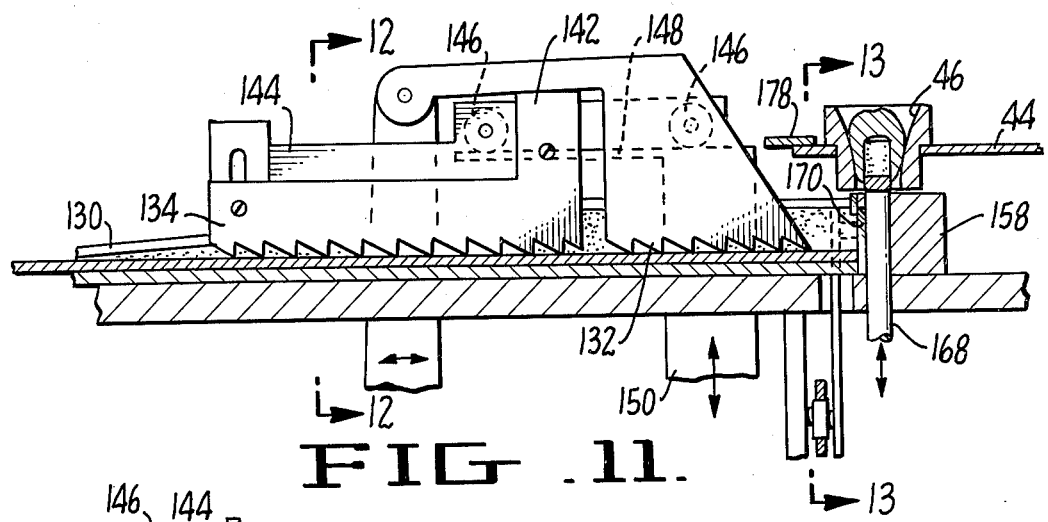
FIG. 11.
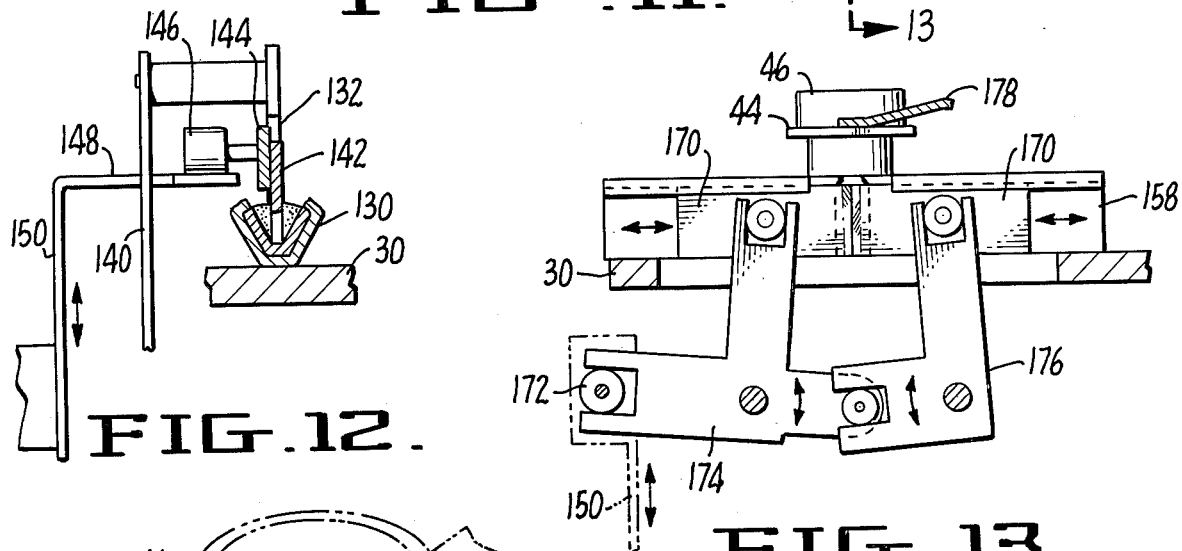
FIG. 12.
FIG. 13.
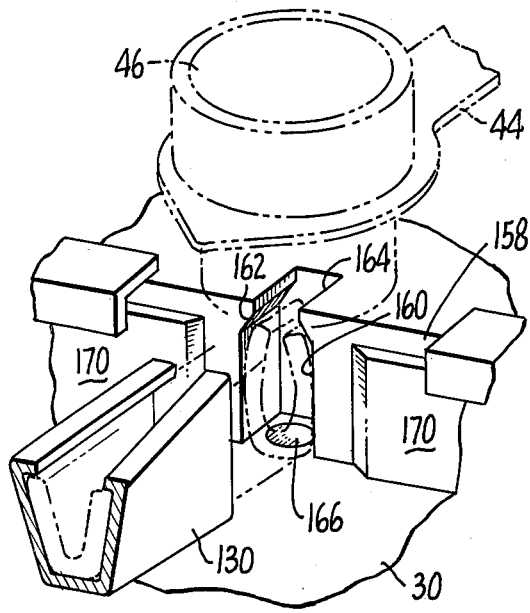
FIG. 14.
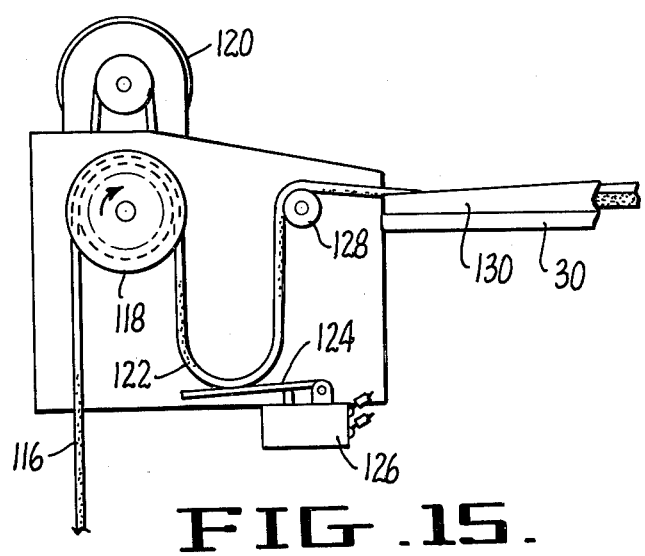
FIG. 15.

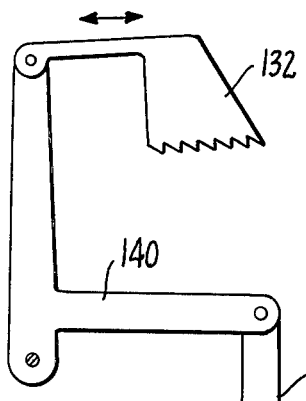
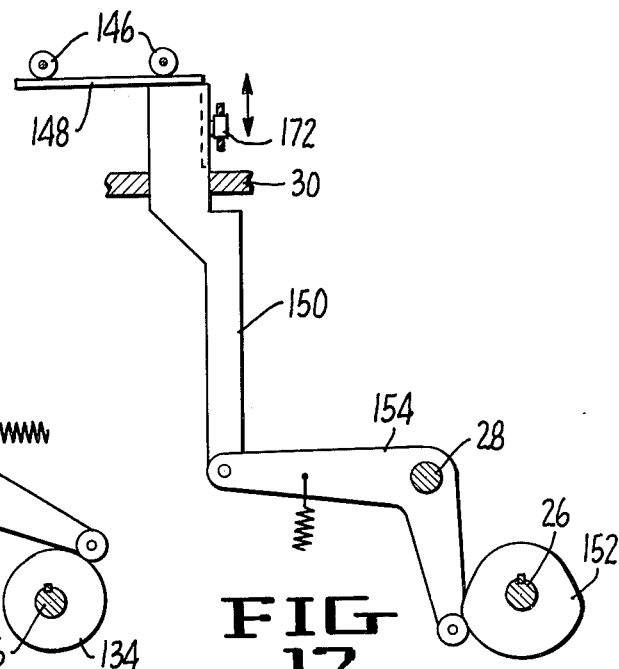
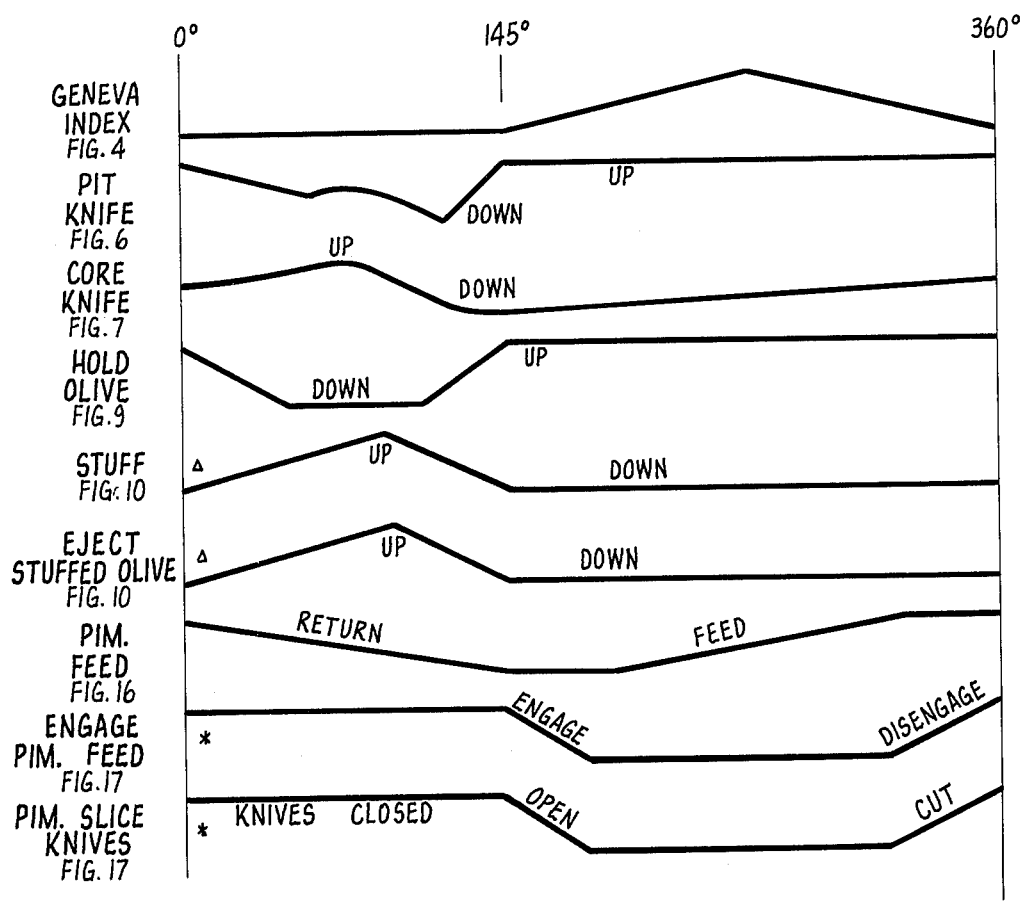

COMBINATION PITTER AND STUFFER FOR OLIVES

This is a continuation of application Ser. No. 586,888, filed June 16, 1975, and now abandoned.

Among the objects of the invention are the following: the provision of a combined pitter and stuffer for olives; to provide a high speed, compact machine of this type; to provide a novel feed and cut-off system for a continuous pimento strip.

These and other objects and advantages of the invention will be apparent from the following description taken in conjunction with the drawings forming part of this specification, and in which:

FIG. 3 is a top plan view of the machine;

FIG. 4 is a bottom plan view showing the Geneva mechanism;

FIG. 5 is a detail view in section along lines 5—5 of FIG. 3 which shows how the olives are oriented through vibration;

FIG. 6 is a view in elevation of the olive pitting knife and its drive system;

FIG. 7 is a view in elevation of the olive coring knife and its drive system;

FIG. 8 is a semi-schematic view of a protective device which ensures that a removed pit will not remain on the coring knife tube to interfere with a subsequent pitting and coring operation;

FIG. 9 is a view in elevation of the olive hold down means at the stuffing station and its operating or drive system;

FIG. 10 is a view in elevation of the pimento stuffing plunger and stuffed olive ejection member and their operating or drive system;

FIG. 11 is a view in elevation of the pimento feeding mechanism and a view in section of the mechanism at the olive stuffing station;

FIG. 12 is a view taken along lines 12—12 of FIG. 11;

FIG. 13 is a view taken along lines 13—13 of FIG. 11;

FIG. 14 is a view in perspective of the mechanism taken at the pimento feed chamber for the olive cups;

FIG. 15 is a semi-schematic view of the automatic feed system for the continuous pimento strip;

FIG. 16 is a view in elevation of one of the pimento strip feed members and its drive system;

FIG. 17 is a view in elevation of the control system for the cut-off knives for the pimento strip; and FIG. 18 is a timing diagram for the Geneva mechanism and the other component mechanisms of the overall system.

The Overall System in General

Figure 1:
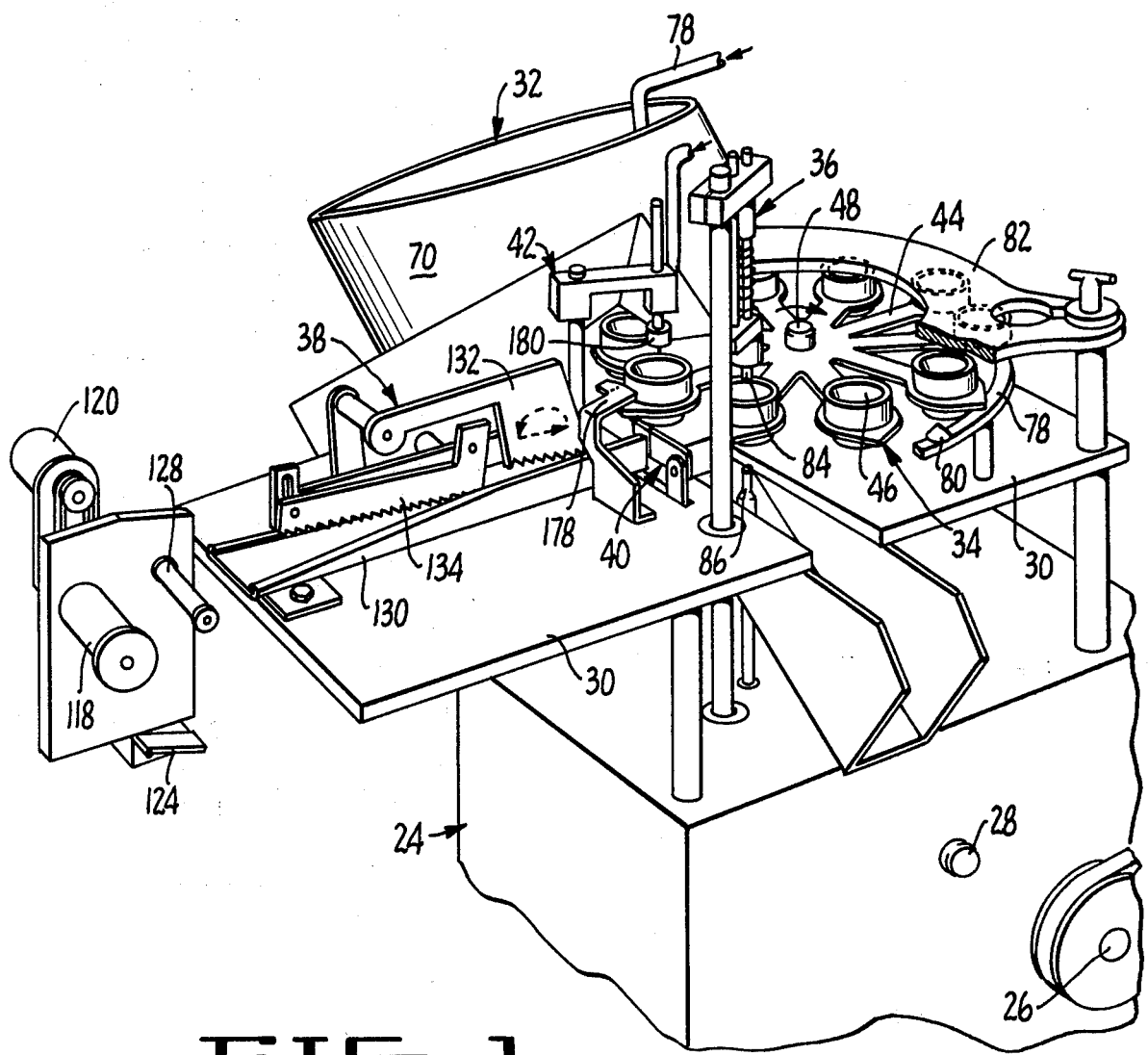
FIG. 1 is a view in perspective of the overall machine.
Figure 2:
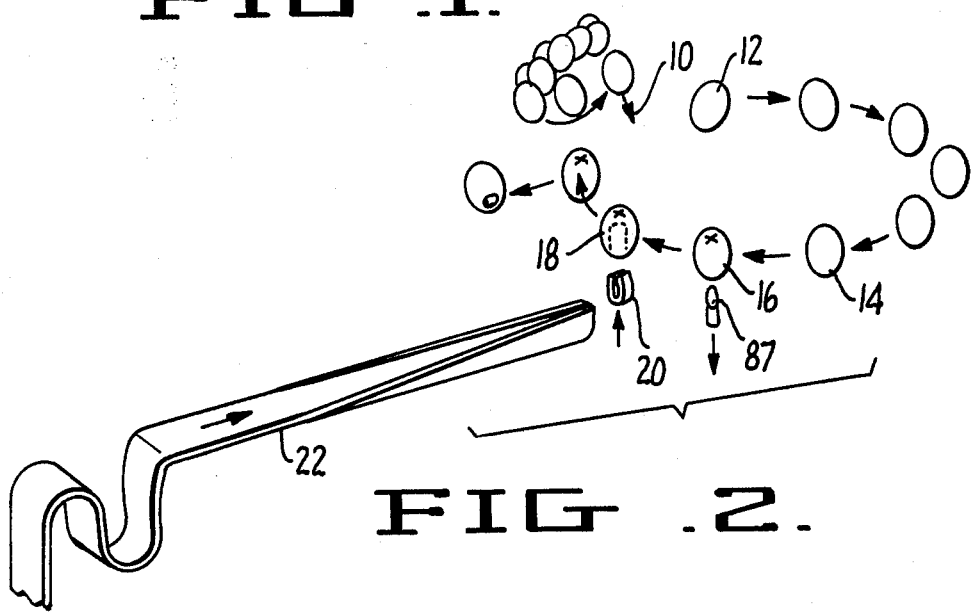
FIG. 2 is a view which shows schematically how olives and the pimento strip are moved with respect to each other by the machine.

FIGS. 1 and 2 illustrate this. FIG. 2 illustrates what is accomplished in the machine at the various stations. At the feed station 10 olives are fed singly into the cups of the olive carrier. From station 12 through station 14 the olives are subjected to vibratory forces so that their long axes become vertically oriented. At station 16 the olives are pitted. At station 18 the olives are stuffed with U-shaped pimento pieces 20 which are cut from an intermittently fed continuous strip of pimento 22.

The overall mechanism comprises housing 24, main drive shaft 26, rocker arm shaft 28, support plate 30, feed hopper 32, olive carrier 34, pitting mechanism 36, pimento feed mechanism 38, pimento cut-off mechanism 40 and pimento stuffing mechanism 42.

The Olive Feeding and Carrying System

The olive carrier 34 comprises a plurality of radial arms 44 having olive cups 46. The carrier is attached to rotary shaft 48 to which there is attached lower down a Geneva wheel 50 (FIG. 4) having notches 52 and members having circular indentation surfaces 54. Continuously driven by drive shaft 26 is Geneva wheel drive shaft 56 (FIG. 4) which carries a Geneva drive element 58 having a circular lobe 60 and a drive pin 62. When the lobe 60 is rotating in close association with one of the indentations 54, the Geneva wheel 50 is stationary. When the lobe has rotated past its associated indentation 54, the wheel 50 is being rotated by the movement of drive pin 62 against the side of a notch 52. Thus, the wheel 50, the shaft 48 driven thereby, and the olive carrier attached to the shaft 48, are all driven with intermittent movement.

The olive feed hopper 32 has a bottom wall feed plate 72 (FIG. 3) which is carried for rotation by shaft 64 (FIG. 4), being driven with intermittent rotative movement by shaft 48 through bevel gears 66 and 68. The tubular side wall 70 of hopper 32 (FIG. 1) remains stationary. Plate 72 is provided with peripheral openings 74 which serve to convey the olives from the bottom to the top of the hopper where they are delivered one by one to the olive cups along delivery chute 76 (FIG. 3). The hopper 32 is provided with an air-blowing tube 78 (FIG. 1) which ensures the delivery of a single olive to a single cup.

The Olive Orientation System

The olives are delivered generally endwise into the cups 46. Between stations 12 and 14 (FIG. 2) the olives in the cups are subjected to vibrational forces which ensure that the olives will be truly vertically positioned for pitting by the time they reach the pitting station 16. For this purpose the cup arms 44 are flexible. To flex and release these arms and thereby vibrate the cups, there is provided a ring segment 78 supported by the table 30 and having spaced conical elements disposed in the path of the outer ends of the cup arms 44. As shown in FIG. 5 by the two-way arrow 81, the arms 44 and cups 46 are caused to vibrate by inter-engagement of the arms with the conical interference members 80 and the movement of the arms past these members 80. To ensure that none of the olives are vibrated out of the cups a cover member 82 (FIGS. 1 and 5) is positioned over the cups from station 12 through station 14.

The Olive Pitting Mechanism

The olives are pitted at station 16 by the conjoint action of an upper pitting knife 84 (FIG. 6) and a lower coring knife 86 (FIG. 7) vertically aligned therewith. The specific arrangement of pitting and coring knives and their cooperative manner of operation is known in the art and shown in several of the present assignee's prior patents. The operational sequence is as follows. The pitting knife 84 comes down into engagement with the top of the pit and the coring knife 86 comes up into engagement with the bottom of the pit. Both knives then move together downwardly to remove the pit 87 (FIG. 2) and the core plug attached thereto out of the olive and beneath the cup. The knives then separate and then reposition themselves as in FIGS. 6 and 7 for the next olive. To accomplish this mode of operation, the pitting knife 84 is attached to reciprocating rod member 88 which is operated by a drive cam 90 through a two-piece rocker arm 92, 94, and the coring knife is carried by a reciprocating rod member 96 which is operated by a drive cam 98 through a rocker arm 100 and a crank arm 102.

Means are provided to ensure that no pit remains attached to the end of the coring knife 86 to interfere with the next pitting operation (FIGS. 7 and 8). Said means comprises a lever arm 104 having a pivotal connection 106 with the plate 30. The lever arm 104 is spring-loaded and is provided with upturned flanges 108, 110 which are successively engaged by rollers 112 carried at the undersides of cup arms 44 to cause a flange 114 at the leading end of lever arm 104 to sweep back and forth over the upper end of the coring knife 86 to remove any pit which might remain on the upper end of the coring knife 86 prior to the commencement of the pitting of the next olive.

The Pimento Feed System

A continuous strip of pimento 116 (FIG. 15) passes over a pimento drive sprocket 118 operated by motor 120. After forming a loop 122, adapted to engage switch control arm 124 which controls switch 126, the strip passes over idler sprocket 128 and into a strip folding chute 130.

The loop 122 of pimento strip constitutes a supply of pimento to be drawn upon by the pimento feed mechanism 38. When the mechanism 38 depletes the loop 122 to bring it up and out of engagement with control arm 124, which is under light spring-loading, arm 124 moves up and switch 126 is enabled to turn on the motor 120 and drive sprocket 118 to replenish the draped loop 122. When the bottom of the loop 122 engages the switch arm 124 and depresses the same against light spring-loading, motor 120 is thereby turned off.

The pimento feed mechanism 38 (FIGS. 1, 11–12 and 16–17) comprises a pair of toothed feed bar members 132 and 134.

As indicated by the two-headed arrow in FIG. 16 the feed bar member 132 is moved forward and backward by means comprising drive cam 134, rocker arm 136, link 138 and crank arm 140. As it moves to the right (FIGS. 1, 11 and 16) it moves the pimento strip through the feed runway or folding chute 130. When it moves to the left it has been lifted up out of engagement with the pimento strip. This is caused by upward movement of the forward end 142 of feed bar member 134. The latter is moved upwardly while feed bar member 132 is moved to the left, feed bar member 134 being carried by plate member 144 which carries rollers 146, the latter bearing against the horizontal flange 148 of a vertically reciprocable member 150 (FIGS. 12 and 17) which is operated by a drive cam 152 through a rocker arm 154.

The Pimento Cut-Off and Stuffing System

The pimento cut-off system is shown in detail in FIGS. 13 and 14.

Plate 30 supports an internally chambered block member 158 (FIGS. 11 and 14). Formed within the block 158 is a pimento-receiving chamber 160 which is disposed adjacent the discharge end of the pimento-folding chute 130. At its upper end the chamber 160 is provided with a necked-down throat 162 and a discharge opening 164. The lower end of the chamber 160 is defined by plate 30 which is provided with a bore 166 to accommodate the vertically reciprocable pimento stuffing rod 168.

A pair of knife blades 170 are mounted adjacent block 158 for movement toward and away from each other by means comprising (FIG. 13) roller 172 carried by arm 150, pivoted crank arm 174 and pivoted crank arm 176. When the arm 150 moves upwardly the knives 170 come together to cut off the charge of pimento within the chamber 160. The knives remain in the cut-off position as the pimento stuffing operation takes place.

At the stuffing station 18 the olive cup is engaged by a hold-down arm 178 (FIGS. 1, 11 and 12). An olive hold-down member 180, forming part of the stuffing means 42, is brought into engagement with the olive by downward movement of the carrier rod 182 by drive cam 184 operating through rocker arm 186. As the olive is thus held down within the cup the stuffing rod 168 (FIGS. 10 and 11) is moved upwardly to force the pimento piece from the chamber 160 into the olive. The transfer of pimento piece from chamber 160 into the olive takes place as the pimento piece is placed under lateral compression by the necked-down throat 162 and the reduced size discharge opening 164 for chamber 160. The compressed condition of the pimento piece within the olive serves to maintain the pimento piece sufficiently tightly engaged with the olive as to prevent any separation of the two under all conditions of subsequent handling and packing. The stuffer rod 168 is operated by drive cam 188 operating through rocker arm 190.

Attached to the stuffer rod 168 through bridge member 192 is an ejector rod 194 which operates upon upward stuffing movement of the rod 168 to eject a stuffed olive from the next adjacent olive cup. The ejector rod is assisted by an air blowing tube 196 (FIG. 10). The olives so ejected pass into a discharge chute 198 (FIG. 3).

The Timing Diagram

FIG. 18 shows how all of the machine operations are sequenced and timed. To the left of the 145° reference line, the Geneva wheel is stationary. During this condition the pimento slicing knives remain closed while the pitting, stuffing and olive ejection steps take place. As the Geneva wheel starts up, the pimento slicing knives 170 move apart and the pimento feed bars 132 and 134 engage the pimento. This is followed by the advancing of the pimento strip through the feed bar means 132, 134. Thereafter, as the Geneva wheel decelerates the pimento slicing knives move toward a closed position and the pimento feed bars 132 and 134 move out of engagement with the pimento strip.

What is claimed is:

1. A pitting and stuffing machine for olives comprising a horizontally disposed turntable and a drive mechanism for intermittently rotating the turntable, said turntable comprising a plurality of horizontally and radially extending vertically flexible arms laterally isolated from each other, an open-ended olive support cup carried by each of said arms, an olive feed mechanism to supply an olive to each cup, a pitting mechanism to which each of said cups is successively moved, means responsive to the movement therepast of said arms to flexibly deflect said arms and thereby impart limited vertical vibratory movement to said arms and consequent vertical orientation to the olives in the cups as said cups travel between said feed mechanism and said pitting mechanism, said pitting mechanism comprising an upper pitting and a lower coring knife pair and means to move them together into engagement with a pit and then together downwardly in a pit and core removing operation, a stuffing mechanism to which each of said cups is successively moved after having been presented to said pitting mechanism, said stuffing mechanism comprising means defining a stuffing-piece positioning chamber, an upper, olive hold-down member, and a lower, upwardly movable plunger operable to move said stuffing-piece upwardly to stuff an olive engaged by said hold-down member, and cooperative means to simultaneously operate said pitting mechanism in association with one of said arms and said stuffing mechanism in association with an adjacent arm without the transmittal between said one arm and said adjacent arm of interfering forces, said cooperative means including the flexibility of said arms and their lateral isolation from each other.

2. A pitting and stuffing machine for olives comprising a horizontally disposed turntable and a drive mechanism for intermittently rotating the turntable, said turntable comprising a plurality of separated, vertically flexible, radial arms, open-ended olive support cups carried by the arms, feed means to supply an olive to each cup, means to orient the olives in the cups prior to pitting comprising means responsive to the movement therepast of said arms to deflect and vibrate said arms, a pitting mechanism to which each of said cups is successively moved, said pitting mechanism comprising an upper pitting and a lower coring knife pair and means to move them together into engagement with a pit and then together downwardly in a pit and core removing operation, a stuffing mechanism to which each of said cups is successively moved after having been presented to said pitting mechanism, said stuffing mechanism comprising means defining a stuffing-piece positioning chamber, an upper, olive hold-down member, and a lower, upwardly movable plunger operable to move said stuffing-piece upwardly to stuff an olive engaged by said hold-down member, and means to maintain the oriented position of said olives within said cups from a time prior to pitting at the pitting station to a time subsequent to stuffing at the stuffing station.

* * * * *